(12) United States Patent
Strong

(10) Patent No.: US 9,268,329 B1
(45) Date of Patent: Feb. 23, 2016

(54) CONTROL INTERFACE

(75) Inventor: Jasmine Louise Strong, San Francisco, CA (US)

(73) Assignee: Google Inc., Moutain View, CA (US)

( * ) Notice: Subject to any disclaimer, the term of this patent is extended or adjusted under 35 U.S.C. 154(b) by 1047 days.

(21) Appl. No.: 13/366,847

(22) Filed: Feb. 6, 2012

(51) Int. Cl.
| | | |
|---|---|---|
| *G05B 11/01* | (2006.01) |
| *G05B 19/18* | (2006.01) |
| *G05B 9/02* | (2006.01) |
| *G05B 23/02* | (2006.01) |
| *G05B 15/02* | (2006.01) |
| *G08C 19/00* | (2006.01) |
| *G08B 29/00* | (2006.01) |

(52) U.S. Cl.
CPC ............ *G05B 23/02* (2013.01); *G05B 15/02* (2013.01); *G08B 29/00* (2013.01); *G08C 19/00* (2013.01); *Y04S 20/227* (2013.01); *Y04S 20/242* (2013.01)

(58) Field of Classification Search
CPC ..... Y04S 20/227; Y04S 20/242; G05B 23/02; G05B 15/02; G08B 29/00; G08C 19/00
USPC .......................................... 700/21, 65, 66, 79
See application file for complete search history.

(56) References Cited

U.S. PATENT DOCUMENTS

| | | | |
|---|---|---|---|
| 6,778,868 B2 * | 8/2004 | Imamura et al. ................. 700/79 |
| 6,924,727 B2 * | 8/2005 | Nagaoka et al. ............... 340/3.1 |
| 6,925,360 B2 * | 8/2005 | Yoon et al. ..................... 700/276 |
| 6,977,585 B2 * | 12/2005 | Falk et al. ...................... 340/506 |
| 7,081,830 B2 * | 7/2006 | Shimba et al. .............. 340/12.31 |
| 8,170,722 B1 * | 5/2012 | Elberbaum .................... 700/295 |
| 2002/0180579 A1 * | 12/2002 | Nagaoka et al. ............... 340/3.1 |
| 2003/0038730 A1 * | 2/2003 | Imafuku et al. .......... 340/825.24 |
| 2007/0046493 A1 * | 3/2007 | Park et al. ................. 340/825.69 |
| 2007/0200658 A1 * | 8/2007 | Yang .............................. 340/3.7 |
| 2008/0221715 A1 * | 9/2008 | Krzyzanowski et al. ........ 700/90 |
| 2010/0305722 A1 * | 12/2010 | Jin et al. ........................... 700/90 |
| 2011/0098832 A1 * | 4/2011 | Zhang ............................. 700/90 |
| 2012/0303137 A1 * | 11/2012 | Schoeller et al. ................. 700/1 |
| 2014/0125492 A1 * | 5/2014 | Jhang et al. .............. 340/870.02 |
| 2014/0129006 A1 * | 5/2014 | Chen et al. ....................... 700/90 |
| 2014/0365018 A1 * | 12/2014 | Kusukame et al. ........... 700/276 |

\* cited by examiner

*Primary Examiner* — Ronald Hartman, Jr.
(74) *Attorney, Agent, or Firm* — Lerner, David, Littenberg, Krumholz & Mentlik, LLP

(57) ABSTRACT

An interface device is interposed between a control server and a controlled device to facilitate communications between the control server and the controlled device. The interface device receives control signals from the control server and relays those signals to the controlled device. Furthermore, the interface device receives sensor readings from the controlled device and forwards them in suit to the server. The control signals may be input into the interface device over a digital connection (e.g., USB connection) and output over an analog channel.

15 Claims, 10 Drawing Sheets

410

411 — CONTROLLED_DEVICE_ID = "Cooling Unit"
412 — SIGNAL_ID = "Fan Power"

413 — SIGNAL_VALUE = 5V;

414 — SIGNAL_INPUT_PARAMETERS = Interface 166;
415 — SIGNAL_OUTPUT PARAMETERS = Interface 161, port 241

416 — SIGNAL_WATCHDOG_COUNTER = 1;
417 — SIGNAL_WATCHDOG_THRESHOLD = 7;

418 — SIGNAL_TYPE = Voltage.
SERVER_101_TO_DEVICE_180

419 — SIGNAL_CONTROL_BITS = "1100101110111"

431 — DEVICE ID = "Cooling Unit"
432 — SIGNAL_LABEL = "Temperature Reading"

433 — SIGNAL_VALUE= 35C;

434 — SIGNAL_TYPE =   TEMPERATURE_SIGNAL
                     SYNTETHIC_TEMP
                     DEVICE_180_TO_SERVER_101

435 — SIGNAL_INPUT_PARAMETERS = Interface 161, port 242;
436 — SIGNAL_OUTPUT PARAMETERS = Interface 166

437 — SIGNAL_TARGET = "30C."
438 — SIGNAL_THRESHOLD = 50C;

439 — SIGNAL_WATCHDOG_COUNTER = 1;
440 — VALUE_WATCHDOG_THRESHOLD = 7;

441 — CONTROL BITS = "1100101110111"

Fig. 4B

CONTROL INTERFACE

BACKGROUND

Automatic control systems may be used to control the functioning of various machines and devices. In operation, automatic control systems may output control signals causing motors of controlled devices to turn, valves to open, or circuit boards to power up. The control signals may be calculated by integrated circuits mounted on system boards.

However, the system boards of automatic control systems sometimes lack sufficient facilities for generating the control signals. For this reason, automatic control systems may use interface devices to generate and receive signals on their behalf. By using specialized circuitry, the interface devices may generate signals having a specified voltage, current, frequency, or another characteristic, which the automatic control systems cannot by themselves produce.

SUMMARY

In operation, interface devices according to the present disclosure may receive and carry instructions from the control systems to output specified signals to various controlled devices. And similarly, the interface devices may also receive feedback signals from the controlled devices, digitize them, and relay the digitized readings to the automatic control systems. The interface devices thus may operate as middlemen between the automatic control systems and the controlled devices.

In one aspect, an interface apparatus is provided for connecting a server to a device controlled by the server. The interface apparatus includes a first interface for connecting the interface apparatus to the device, a second interface for connecting the interface apparatus to the server, a memory, and a processor coupled to the memory. The memory stores a data structure that includes a first variable having a value, the value indicating a control signal characteristic determined by the server as part of the server controlling the device. The processor is configured to search the memory for one or more data structures that correspond to one or more signals transmitted, via the interface apparatus, between the server and the device and identify the corresponding one or more data structures as a result of the search. Once it is generated, the processor is further configured to generate a control signal for controlling the operation of the device, the generated control signal having the control signal characteristic indicated by the value of the first variable. The control signal is output to the device, by the processor, via the first interface. In one example, the control signal is used to control an actuator that is part of the device controlled by the server.

In some instances, the search of the memory for one or more data structures is performed repeatedly by the processor in accordance with a control loop that controls the operation of the interface apparatus. In other instances, the processor is configured to receive the data structure from the server via the second interface and store the data structure in the memory. In further instances, the processor is configured to update the value of the first variable based on content of one or more messages received from the server via the second interface.

In addition, in some instances, the value of the first variable indicates a characteristic of an analog signal that is supplied via the first interface to the device controlled by the server. In other instances, the data structure includes a second variable and a third variable. The third variable identifies a routine to be invoked when the value of the first variable matches the value of the second variable.

Moreover, in some instances, the data structure includes an indication of a sub-type of the first variable and the memory also stores at least one of data and processor-executable instructions for translating content of a message from a first format to a second format that corresponds to the sub-type. In these instances, the processor is configured to receive from the server a message indicating a characteristic of the control signal, translate the message to produce a synthetic value and update the value of the first variable based on the synthetic value. The translation is based on the indication of the sub-type and at least one of the data and processor-executable instructions.

In another aspect, an interface apparatus for connecting a server to a device controlled by the server is provided. The interface apparatus includes a first interface for receiving, from the device, a feedback signal, a second interface for transmitting, to the server, an indication of a characteristic of the feedback signal, a memory, and a processor coupled to the memory. The memory stores a data structure that includes a first variable having a first value, the first value indicating a characteristic of the feedback signal. The processor is configured to search the memory for one or more data structures that correspond to one or more signals that are transmitted, via the interface apparatus, between the server and the device and identify the corresponding one or more data structures as a result of the search. The processor is further configured to generate a message based on the value of the first variable in response to identifying the corresponding one or more data structures. The generated message indicates a characteristic of the feedback signal and it is transmitted to the server via the second interface.

In some instances, the processor is further configured to update the value of the first variable based on signal received from the device via the first interface. In other instances, the processor is further configured to receive the data structure from the server via the second interface and store the data structure in the memory. In further instances, the search of the memory is performed repeatedly by the processor in accordance with a control loop that controls the operation of the interface apparatus. In yet further instances, the data structure include a second variable and a third variable, the third variable identifying a procedure to be invoked when the value of the first variable matches a value of the second variable.

Furthermore, in some instances, the feedback signal is a signal continuously supplied to the interface apparatus by a sensor that is part of the device controlled by the server. In other instances, the data structure includes an indication of a sub-type of the first variable and the memory also stores at least one of data and processor-executable instructions for translating the feedback signal received from the device to a format that corresponds to the sub-type. The processor is further configured to translate the feedback signal received from the device to produce a synthetic value. The translation is based on the indication of a sub-type and at least one of the data and processor-executable instructions. The value of the first variable is updated by the processor based on the synthetic value.

In yet another aspect, an apparatus for controlling the operation of a controlled device via an interface device is provided. The apparatus includes an interface for connecting the apparatus to the interface device, and a processor. The processor is configured to receive over a communications network, an indication of a target state for a controlled device and an indication of a present state of the controlled device. The indication of the present state is based on a feedback signal supplied by the controlled device to the interface device. The processor is further configured to determine a first control signal for controlling the operation of the controlled device, the first control signal being based on the received target state of the first controlled device and the received present state of the first controlled device. Moreover, the processor is configured to generate a message indicating a characteristic of the control signal, and transmit the message to the interface device over the communications network.

In some instances, the message specifies a signal level. In other instances, the indication of the present state of the first controlled device is a value of a sensor measurement. In further instances, the indication of the target state is an indication of a preferred characteristic of operation of the controlled device. In yet further instances, the processor is configured to generate a data structure that includes an indication of the target state, and transmit the data structure to the interface device via the interface, the data structure being transmitted before the indication of a target state is received from the interface device. Furthermore, in some instances, the data structure includes a first variable and an indication of a sub-type associated with the first variable. In the latter instances, the processor being further configured to transmit at least one of data for generating a string or number based on a characteristic of an analog signal, the data corresponding to the sub-type, and processor-executable instructions for generating a string or number based on a characteristic of an analog signal, the processor-executable instructions also corresponding to the sub-type.

BRIEF DESCRIPTION OF THE DRAWINGS

FIG. 4A depicts a schematic diagram of a data structure in accordance with aspects of the present disclosure.

FIG. 4B depicts another schematic diagram of a data structure in accordance with aspects of the present disclosure.

DETAILED DESCRIPTION

In one aspect, an interface device is interposed between a control server and a controlled device to facilitate communications between the control server and the controlled device. A data structure may be stored in the memory of the interface device that stores all information that is exchanged between the server and the controlled device. The data structure therefore may serve as a pass-through point for communications that take place between the control server and controlled device.

Figure 1:
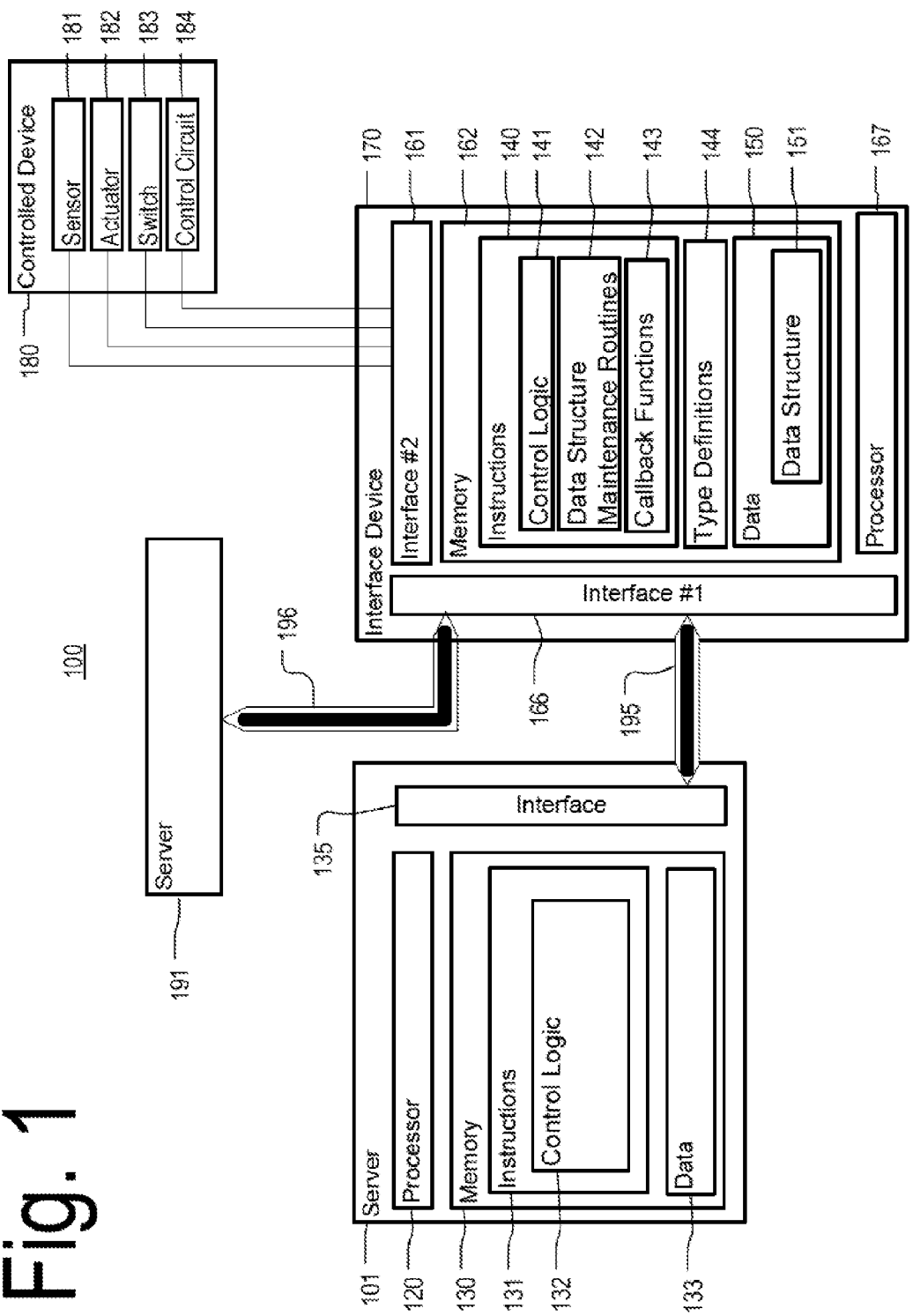
FIG. 1 depicts a schematic diagram of a system in accordance with aspects of the present disclosure.

As shown in FIG. 1, an exemplary system 100 may include a server 101, an interface device 170, and a controlled device 180. Server 101 is an example of an automatic control system. Server 101 may contain a processor 120, memory 130 and other components typically present in computing devices. Memory 130 of server 101 stores information accessible by the processor 120, including instructions 131 that may be executed by the processor 120. Memory also includes data 133 that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 120 may be any well-known processor, such as commercially available processors. Alternatively, the processor may be a dedicated controller such as an ASIC.

The instructions 131 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. In one aspect, the control logic 132 is used by server 101 to generate control signals for setting various aspects of the operation of device 180. The control signals may be used to activate or stop an actuator, close or open electrical switches, and other purposes. Functions, methods and routines associated with control logic 132 are explained in more detail below.

Data 133 may be retrieved, stored or modified by processor 120 in accordance with the instructions 131. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

Although FIG. 1 functionally illustrates the processor 120 and memory 130 as being within the same block, the processor 120 and memory 130 may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor 120 may actually comprise a collection of processors which may or may not operate in parallel.

Interface device 170 provides an interface between the server 101 and the controlled device 180. Interface device 170 may be configured similarly to the server 101, with a processor 162, memory 140, instructions 162, and data 150. For example, interface device 170 may be an embedded system including an Atmel ATmega32u4 microcontroller, 500 bytes of RAM, 16 k Flash Memory and powered by 5V power supply at 20 mA. Furthermore, interface device 170 may be a personal computer, embedded system, a cell phone, or another device.

Interface device 170 may be connected to sever 101 via interface 166 using connection 195. Connection 195 may be a Universal Serial Bus (USB) connection, parallel port connection, SATA connection, or network connection (e.g., Ethernet). Thus, interface 166 may be a USB interface, Ethernet card, or another such interface. In addition, interface device 170 may be connected to server 191 via interface 166 using connection 196. Server 191 may have the same or similar structure as server 101. Server 191 may communicate with interface device 170 over data connection 196. Connection 196 may be a data connection that is the same or similar to connection 195. Server 191 may act as a backup to server 101 by taking over the functions of server 101 in the event that the latter fails.

Furthermore, interface device 170 may use interface 161 to connect with controlled device 180. In one aspect, interface 161 may include software and hardware for transmitting and receiving analog signals, such as a digital-to-analog converter (DAC), analog-to-digital converter (ADC) and so forth. In another aspect, interface 161 may include a One-Wire, I2C, SPI, USB, Bluetooth, Ethernet or 802.11 adapter, or any other wired or wireless interface for exchanging communications.

Although interfaces 166 and 161 are depicted as separate components, in other examples they may be integrated as a single component. Thus, interfaces 161 and 166 may be operated either by the same controller (e.g., a USB chipset that is part of the interface device 170) or different controllers (e.g., a USB chipset and a Bluetooth chipset).

Data structure 151 stores information that is exchanged between the server and the controlled device. According to one aspect, the data structure may store one or both of: (i) indications of control signals received at interface device 170 from server 101 and (ii) indications of feedback signals received at interface device 170 from controlled device 180. In one example, data structure 151 includes data structures 410 and 430 which are described in further detail below with respect to FIGS. 4A, 4B, and 5.

Control logic 141, in one aspect, may include instructions for generating signals for controlling the operation of device 180. The instructions may be either identical or different from control logic 132.

Maintenance routines 142 may include processor-executable routines for parsing and executing commands relating to the maintenance of data structure 151 or constituent data structures that are part of it, such as data structures 410 and 430. For example, the commands may include commands for deleting variables from data structures 410 and 430, resetting variables' values, and adding new constituent data structures to data structure 151. The commands may be invoked by server 101 over the course of its interactions with device 180 and interface device 170.

Functions 143 may include one or more routines used by interface device 170. The routines are further described in the discussion with respect to FIG. 5. Sub-type definitions 144 may include logic and/or data for translating raw data that is received from one or more of sensor 181, actuator 182, switch 183, and control circuit 184 of the controlled device 180. Furthermore, sub-type definitions 144 may include logic and/or data for translating information received from server 101. In one aspect, a sub-type definition may be used to process raw signal, e.g., current fed by a sensor to the device or messages to a number or a string that indicates a characteristic of the state of device 180.

Figure 2:
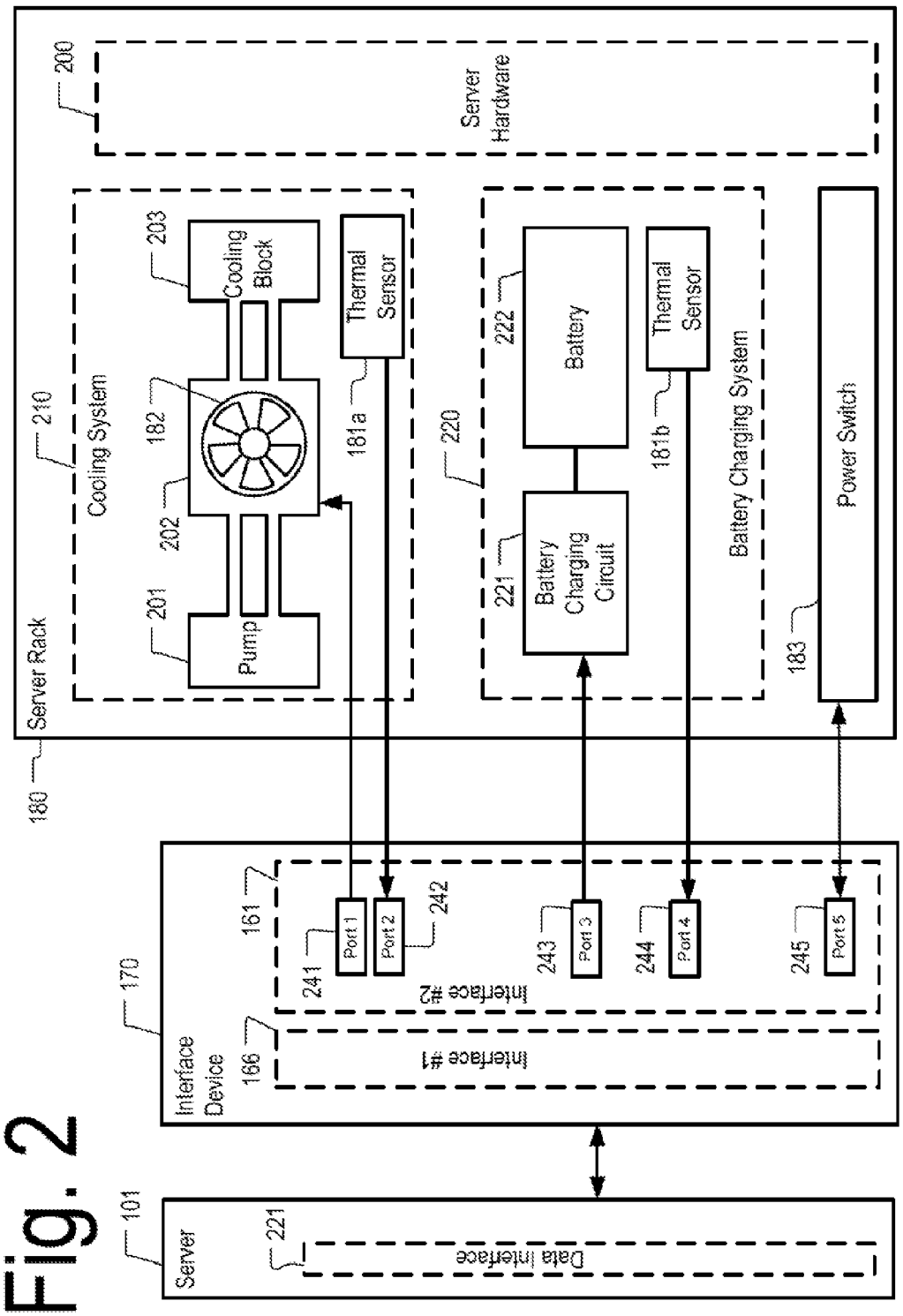
FIG. 2 depicts a schematic diagram of the system in accordance with aspects of the present disclosure.

For example, as shown in FIG. 2, sensor 181*a* may be a thermistor that feeds current to interface device 170. The current is an example of raw signal. If device were to store a raw current value in data structure 151, it could store the current voltage, flow rate, and other characteristics that can be measured solely by observing the current.

If interface device 170 were to store a synthetic value, it may translate the current to a temperature value (e.g., 30° C., 50° C.). In that regard, device 170 may have to calculate the resistance of the thermistor based on the voltage of the signal received from it and then relate the resistance to a corresponding temperature by either calculating using a formula (provided by thermistor's manufacturer) or by consulting a table. The formula or table may be part of a subtype definition and depend at least in part on the specific type of component which feeds raw signal to interface device. Different thermistors may have different characteristics which in turn necessitate the use of different formula constants, or formulas, when converting raw signal from the thermistors to synthetic temperature readings.

The final outcome of translating the raw signal based on the sub-type definition and raw signal received from device 280 is a synthetic value. For example, the synthetic value may be the string of "30° C." or the number "30". The synthetic value is a value that cannot be obtained by observing the raw signal alone, but obtaining it rather requires information that is specific to the sensor, such as the sensor's curve, gradient, or intercept.

Device 180 is an electronic device that is controlled with signals generated by server 101. Device 180 may include one or more of sensor 181, actuator 182, switch 183, and control circuit 184. Sensor 181 may include one or more sensors, such as temperature sensors, water flow sensors, airflow sensors, fan speed sensors, and so forth. Actuator 182 may be an electric motor, a magnet, or another device for moving or controlling a mechanism or a system. Switch 183 may be a relay or another type of switch, and the control circuit 184 may be any type of circuit (digital or analog) that is part of device 180.

In one example, device 180 may be a server rack. The server rack may include server hardware 200. Server hardware 200 may include one or more servers. Each of the servers may include one or more processors, memory, and other components that are typically found in computers. In this example, the server rack includes a cooling system 210 that cools the air temperature inside it and a battery charging system 220 that provides a battery backup for the server hardware 200. The server 101, via interface device 170, controls the operation of the cooling system 210 and battery charging system 220 in order to achieve a smooth and safe operation of server hardware 200.

The cooling system 210 includes a pump 201 that circulates coolant through a radiator 202 and cooling block 203. To dissipate heat away from the radiator 202, the cooling system 210 uses the fan 182. However, because the fan's operation results in increased noise and energy consumption, the fan may be activated only when necessary. In operation, server 101 may use sensor 181*a* to monitor the air temperature inside server rack 180 and activates the fan 182 only when the temperature exceeds a threshold. Furthermore, in one aspect, the server may vary the speed of the fan based on temperature readings from sensor 181*a*. For example, if the temperature is 20° C., the server 101 may cause the fan 182 to rotate at 1000 RPM which speed is increased as the temperature rises. Thus, if the temperature were to increase to 40° C., the server 101 could raise the fan speed to 2000 RPM. The logic that varies the speed as a function of temperature may be implemented as part of the control logic 132 of server 101.

The battery charging system 220 includes a charging circuit 184, battery 222, and thermal sensor 181*b*. In operation, server 101 uses sensor 181*b* to monitor the temperature of the battery 222. When the battery temperature crosses a threshold, the battery charging circuit 201 could be switched off by the server 101 in order to prevent overheating. Furthermore, in one aspect, the server 101 may vary the amount of charging current delivered to the battery 222 in dependence on the battery's temperature. When the battery 222 is running hot, the server 101 may opt for delivering less charging current to the battery 222 in order to prevent it from overheating.

Power switch 183 is a switch that can be used to cut off the supply of power to server hardware 200. When the server 101 detects that sensor 181b has failed, for example, it may open the switch 183 in order to shut down the servers in the rack 180 in order to prevent overheating.

As FIG. 2 illustrates, interface device 170 is interposed between the server 101 and device 180. Interface device 170 may communicate with server 101 over a digital connection (e.g., USB, Bluetooth, TCP/IP) and may output analog signals to device 180. In this example, port 241 may be an analog output port that provides signal to the cooling fan 182. The signal may be used to power the fan 182, or alternatively it may set the fan's speed by regulating a control circuit associated with the fan's motor. Port 242 may be an analog input port that receives signal from the thermal sensor 181a. Port 243 may be a port for supplying signal to the battery charging circuit 221. The signal supplied over port 243 may activate or disable the charging circuit, or alternatively it could set the amount of current delivered to the battery. Port 244 may be an analog input port that receives signal from the thermal sensor 181b. Port 245 is for outputting a signal that either opens or closes the power switch 183. The power switch 183 may be used to cut power to device 180.

Figure 3:
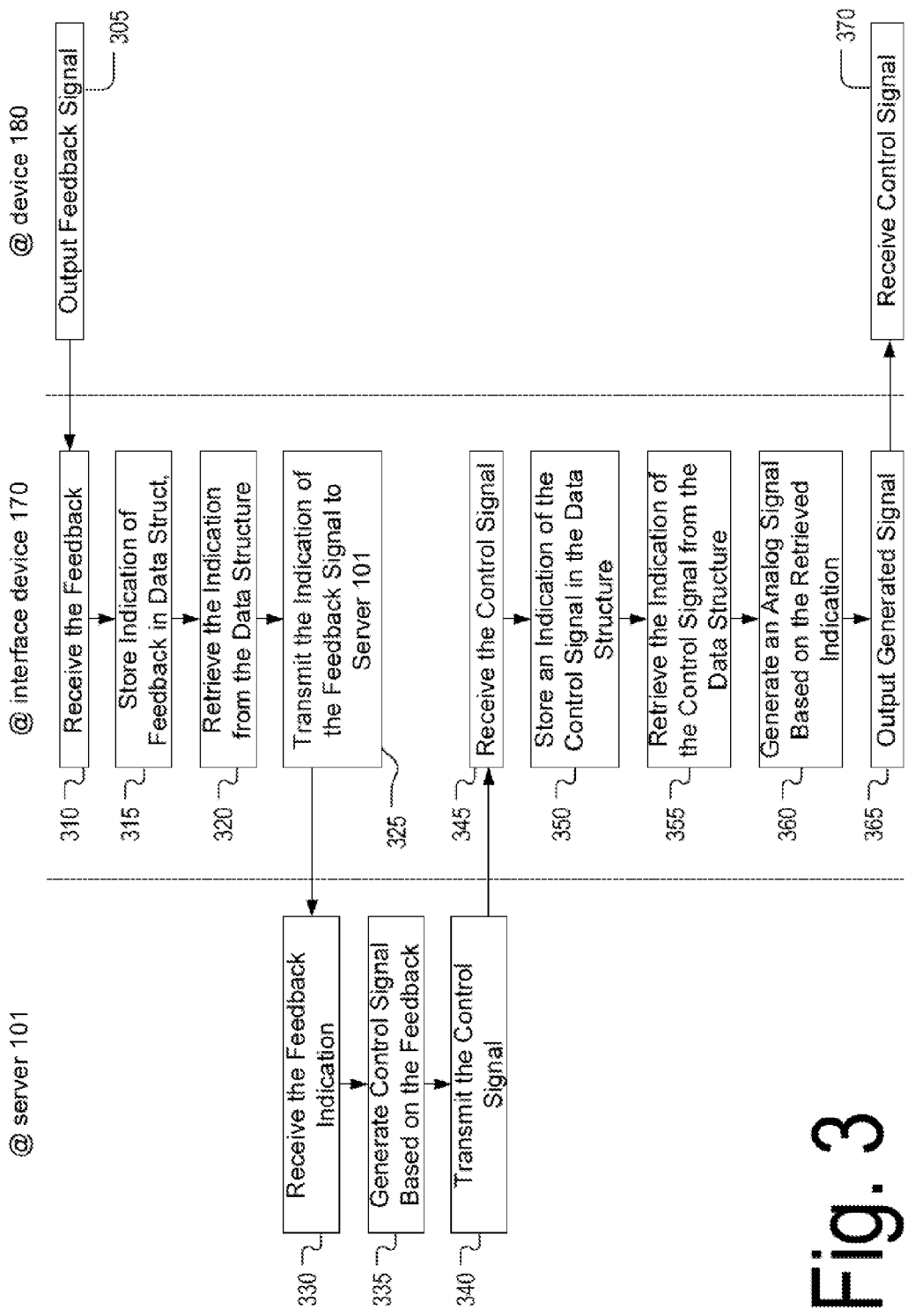
FIG. 3 depicts a flowchart of a process in accordance with aspects of the present disclosure.

FIG. 3 provides a high-level example of the role of interface device 170 in the interactions between server 101 and device 180. In accordance with this example, the sensor 181a of device 180 feeds signal to interface device 170 (task 305). The feedback signal indicates the air temperature inside the device. The interface device 170 receives the feedback signal (task 310) and stores an indication of it in data structure 151 (task 315). Afterwards, the interface device 170 retrieves the indication of the feedback signal from the data structure 430 (task 320) and transmits it to the server 101 (task 325). In that regard, the message transmitted to server 180 indicates the temperature inside server rack 180.

Server 101 receives the message (task 330) and generates a control signal based on the message's content. For example, if the air temperature inside server rack 180 is 50 C, the server 101 may generate a control signal that would cause the cooling fan 182 to spin faster. Alternatively, if the air temperature is 20° C., the server 101 may generate a signal that would cause the cooling fan 182 to stop spinning. The generated control signal is transmitted, via connection 195 to interface device 170 (task 340).

Interface device 170 receives the control signal (task 345) and stores an indication of the control signal in data structure 410 (task 350). Afterwards, interface device 170 retrieves the indication of the control signal from the data structure 410 (task 355), and outputs an analog signal, that is based on the retrieved control signal indication, to the device 180 (task 360). The signal is output to the device 180 (task 365). Device 180 receives the signal (task 370) and changes its operation based on the signal. For example, the cooling fan 182 may start to spin faster or, alternatively, it may be stopped.

As illustrated above, the exchanged signals have two directions: server-to-controlled-device (e.g., control signals) and controlled-device-to-server (e.g., feedback signals). Before reaching its destination, each signal passes through interface device 170. Interface device 170 may or may not translate the signals before transmitting them further along their way.

In one example, every time interface device 170 receives a signal, that signal is stored in data structure 151 before being forwarded. Because all received signals are desirably concentrated in data structure 151, data structure 151 could be used when system 100 is troubleshot. Simply by accessing data structure 151, one may be able to find all the information about the state of device 180 (or interface device 170) that is needed to debug a failure in the system 100. In that regard, concentrating the indications of the feedback and control signals passed between server 101 and device 180 increases the maintainability of the system 100.

Figure 5:
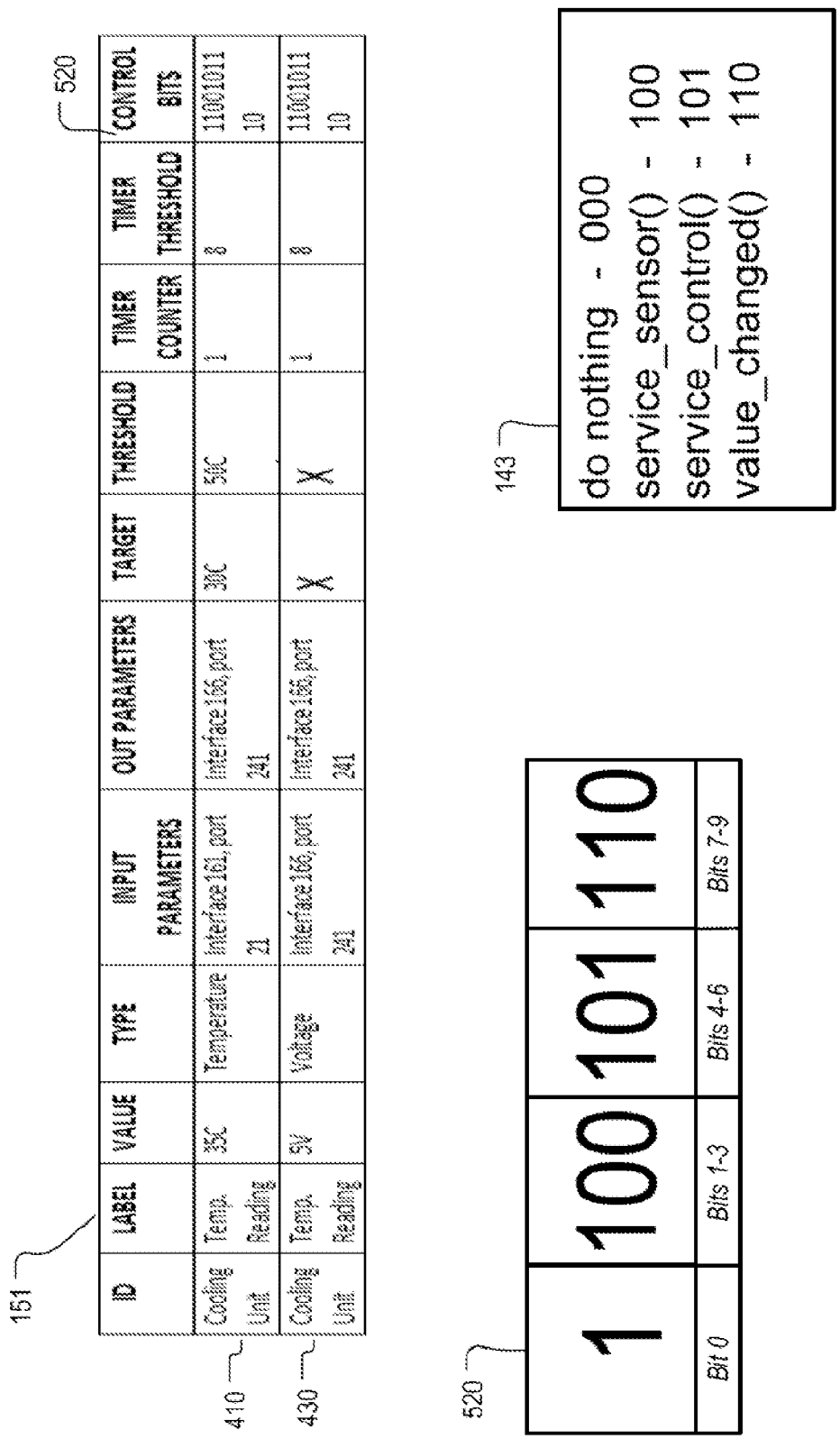
FIG. 5 depicts a schematic diagram of a data structure variable for use in one of the data structures of FIGS. 4A and 4B.

FIGS. 4A, 4B, and 5 provide a high-level example of the composition of data structure 151. Data structure 151 may be a collection of other data structures. Each constituent data structure may correspond to a different signal or plurality of signals. For example, data structure 151 may be an array of "structs," wherein each struct in the array corresponds to a signal that passes through interface device 170. In the present example, data structure 151 includes data structures 410 and 430. Data structure 410 (FIG. 4A) is associated with a control signal generated by server 101 and data structure 430 (FIG. 4B) is associated with a feedback signal produced by device 180.

FIG. 4A depicts an example of data structure 410. In this example, data structure 410 includes variables 411-419. Variable 411 identifies a device that is associated with the control signal. As FIG. 4A illustrates, variable 411 indicates data structure 410 is associated with cooling unit 210. Variable 412 is a label for the control signal and it may serve to identify data structure 410 as being associated with a particular signal.

Variable 413 may be a pointer, number, string literal, or another data structure. Variable 413 may indicate a signal characteristic (e.g., voltage, frequency) or, alternatively, it may indicate a message (e.g., control code, bit string, ASCII string) that is to be transmitted to a device 180. In the present example, variable 413 specifies the voltage of the signal supplied over port 241 to cooling fan 182. Thus, in one aspect, variable 413 indicates a characteristic of a control signal that passes through interface device 170 on its way to device 180.

Variable 414 may identify one or more of a port number, interface device, connection, or protocol, over which the control signal is received at interface device 170. In a similar manner, variable 415 may identify one or more parameters of the connection over which the signal, based on the value of variable 413, is output to device 180 (e.g. port number, interface ID). In the present example, variable 415 specifies that the signal is output from port 241 of interface 161. Thus, the variables 414 and 415 may specify parameters for ingress and exit from interface device 170 of one or more signals (or messages) associated with data structure 410.

Variables 416-417 are used in a watchdog timer implementation. Their use is further described in the discussion with respect to FIG. 7.

Variable 418 specifies a type of the signal. The type identifies a class of signals (e.g., voltage, current signals, and temperature signals). In some examples, the type may also identify the direction of the signals (e.g., sever_101-to-device_180, device_180-to-server_101). Furthermore, the class of signals represented by the data structure 410 is not limited to physical signals, but it may also include bit vectors (e.g., status and control words, bit strings, ASCII strings). In that regard, signals that pass through interface device 170 (both feedback and control signals), and are stored in data structure 151, may include physical signals, as well as status and control words.

Variable 419 stores one or more control bits. The structure and use of the control bits is further described in the discussion with respect to FIG. 5.

FIG. 4B depicts an example of data structure 430. In this example data structure 430 is associated with a feedback signal produced by device 180. As noted above, the feedback signal may be an analog signal, a digital signal, or a message (e.g., Bluetooth or USB message). In this example, data structure 430 includes variables 431-441. Variable 431 indicates that cooling unit 210 is associated with the feedback signal. Variable 432 is a label for the feedback signal and it may be used to identify data structure 430 as being associated with a particular signal.

Variable 433 may be a pointer, number, string literal, or another data structure. Variable 433 may indicate a characteristic of feedback signal received from device 180. In this example, variable 433 indicates that the sensor 181*a* has measured the air temperature inside the server rack 180 at 35 C. Thus, in general terms, the value of variable 433 indicates a characteristic of a feedback signal that passes through interface device 170 on its way to server 101.

Variable 434 indicates signal type. Moreover, in the example of FIG. 4B, variable 434 also specifies a signal sub-type. It indicates that the value of variable 433 is a number (or string) that represents the air temperature inside server rack 184. By contrast, if variable 433 were set to indicate that the sub-type of variable 433 is "raw" that would mean that the value of variable 433 is a number that represents voltage, resistance, or another signal characteristic that does not quantify temperature in and of itself.

Variable 435 may identify one or more of a port number, interface device, connection, or protocol, over which the signal which variable 433 is based on is received. In the present example, variable 435 indicates that the value of variable 433 is set based on signal received at port 242. In a similar manner, variable 436 identifies one or more parameters of the connection over which messages, based on the value of variable 433, are transmitted to server 101. Variable 436 may identify one or more of a port number, address (e.g., IP address), MAC, or interface over which the signal is output. Thus, the variables 414 and 415 may specify parameters for ingress and exit from interface device 170 for one or more signals (or messages) associated with data structure 430.

Variable 437 identifies a target state for the controlled device 180. In the example of FIG. 4B, it specifies a target temperature which server 101 should strive to achieve by controlling the operation of cooling fan 182. Specifically, variable 437 provides that server 101 should maintain the air temperature inside server rack 180 at 30° C. Broadly speaking, the target state may be any state of a controlled device which server 101 is capable of influencing. Examples of target states, outside of the context of server cooling, may include preferred pressure, preferred speed, preferred viscosity, preferred pH, preferred frequency, and others.

Variable 438 specifies a threshold for the signal value stored in variable 433. Crossing the threshold may cause interface device 170 to execute one or more of the functions 143 (e.g., value_changed( )) in order to inform the server 101 that the threshold has been crossed. In this example, the threshold is set to 50° C. When the value of variable 433 exceeds 50° C., server 101 or interface device 170 may generate a signal that will power down device 180 in order to prevent damage.

Variables 439-440 implement a watchdog timer. Their use is further described in the discussion with respect to FIG. 8. Variable 441 stores one or more control bits. The structure and use of the control bits is further described in the discussion with respect to FIG. 5.

FIG. 5 depicts a tabular rendition of data structure 151, wherein data structures 410 and 430 correspond to different table rows. In that regard, interface device 170 may be viewed as including a table whose rows correspond to different signals passing through the device. The rows (e.g., data structures 410, 430) are independent of semantic context. That is, the same table can be used to store signals used in controlling battery charging system 220, or another device that is completely unrelated in function or purpose to the context of device 180—e.g., server racks. In one aspect, as long as a device is controlled by a computer control system through the exchange of control and feedback signals, data structure 151 may be used to store those signals.

FIG. 5 also depicts a list of the functions 143 available on interface device 170 and a schematic diagram of a control bit string. The functions 143 are stored in memory and are generic in their nature. The same functions may be invoked on signals regardless of their semantic significance (e.g., signals that control a cooling system, a battery system, or any other controlled device). For example, the value_changed( ) function may be used to transmit feedback from a temperature sensor, feedback (e.g., bit code) from a processor-based control on device 180, feedback from actuators, and so forth. Examples of the functions 143 are provided in the discussion of control bits 520 below.

String 520 is an example of a control bit string. In one aspect, bits in the string define one or more actions to be taken when a variable in the data structures 410 and 430 reaches a specific value. The value of either of variables 419 and 441 may be set to equal string 520.

Bit 0 indicates whether a signal is enabled. For example, in instances where an enable bit is used, the interface device 170 may use a data structure only if the value of bit 0 is set to indicate an "enabled" state.

Bits 1-3 identify a function to be invoked when the value of a data structure is not updated. Specifically, bits 1-3 may identify a function to be invoked when signal from a sensor is lost. In the present example, the bits 1-3 identify the function service_sensor( ). Invoking this function may cause interface device 170 to transmit an indication to server 101 that a sensors in device 180 has failed.

Similarly, bits 4-6 may identify a routine to be invoked when signal from server 101 is lost. In this example, bits 4-6 identify the function sevice_control( ). When service_control( ) is invoked, the value of variable 413 may be calculated by service logic 141 and not by server 101. Or alternatively, invoking the service_control( ) function may cause a message to be transmitted to server 191 notifying it that server 101 has failed and prompting it to take over control of device 180.

Bits 7-9 identify a function to be invoked by interface device 170 when the value of first variable that is part of the data structure (e.g., data structure 410, 430), becomes equal to the value of another variable that is part of the same data structure. For example, they may specify whether at all and what function is called if the value of variable 433 exceeded the threshold value 437. In the present example, the bits 7-9 identify the value_changed( ) function. Calling the value_changed( ) function may cause a message based on the value of variable 433 to be transmitted to server 101.

Figure 6:
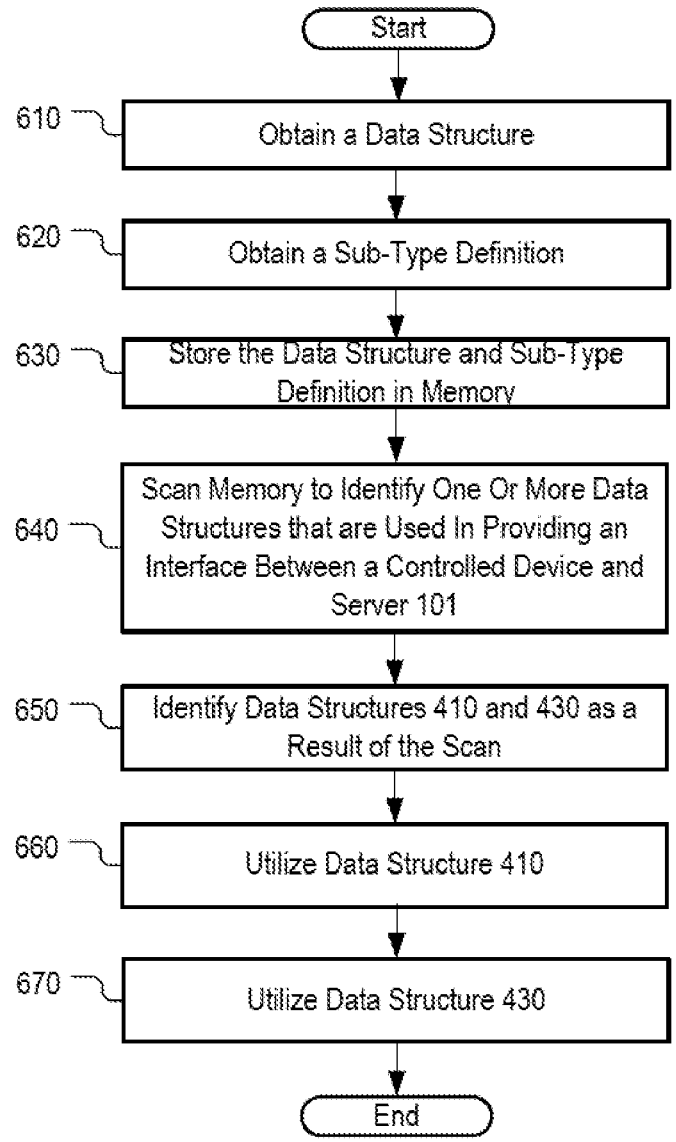
FIG. 6 depicts a flowchart of a process in accordance with aspects of the present disclosure.

FIG. 6 depicts a flowchart of the operation of interface device 170 in accordance with one example. At task 610, interface device 170 receives at least one of data structures 410 and 430. At task 620, interface device 170 receives a sub-type definition. The subtype definition may include data or processor-executable instructions for converting raw sensor data to a synthetic signal value. In the present example, the subtype definition is used to derive a synthetic signal value from raw signal that is fed to interface device 170 by sensor 184*a*.

At task 630, the data structure(s) and sub-type definition are stored in the memory 162 of interface device 170.

At task 640, interface device 170 searches the memory 162 for data structures that are used in interfacing between server 101 and one or more controlled devices, such as device 180. Task 640, and the tasks that follow it, may be executed repeatedly as part of a control loop.

Figure 7:
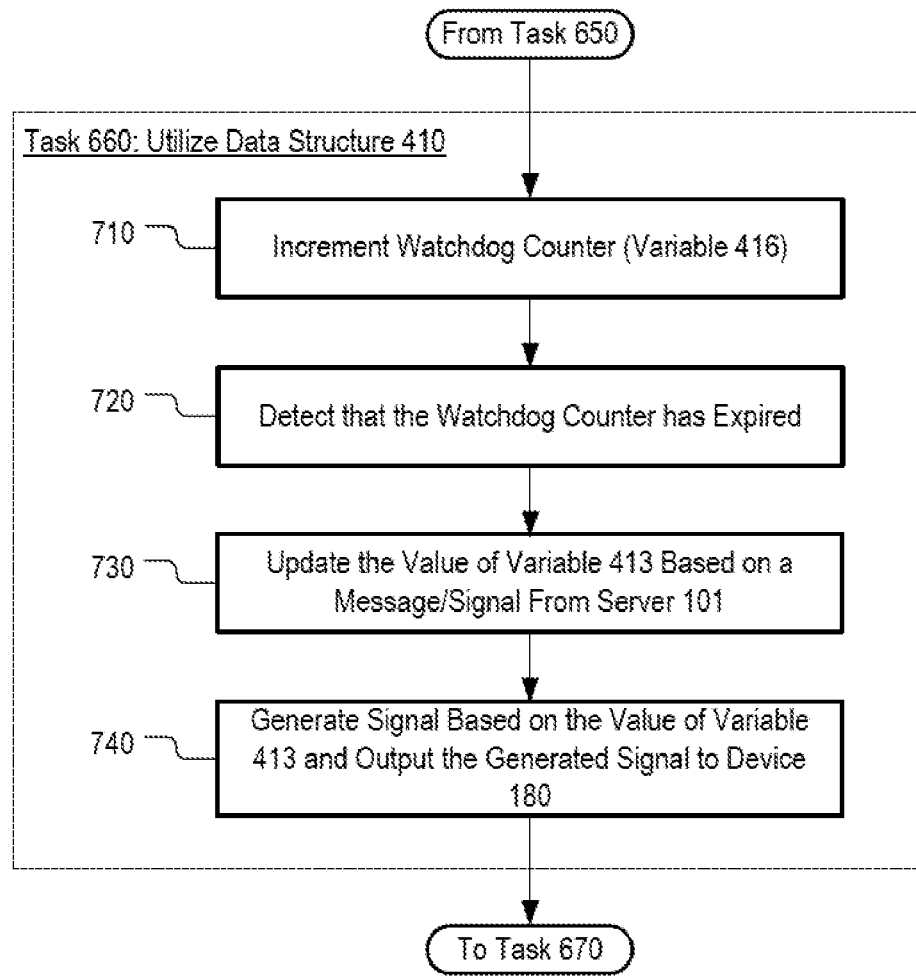
FIG. 7 depicts a flowchart of subtasks associated with FIG. 6.
Figure 8:
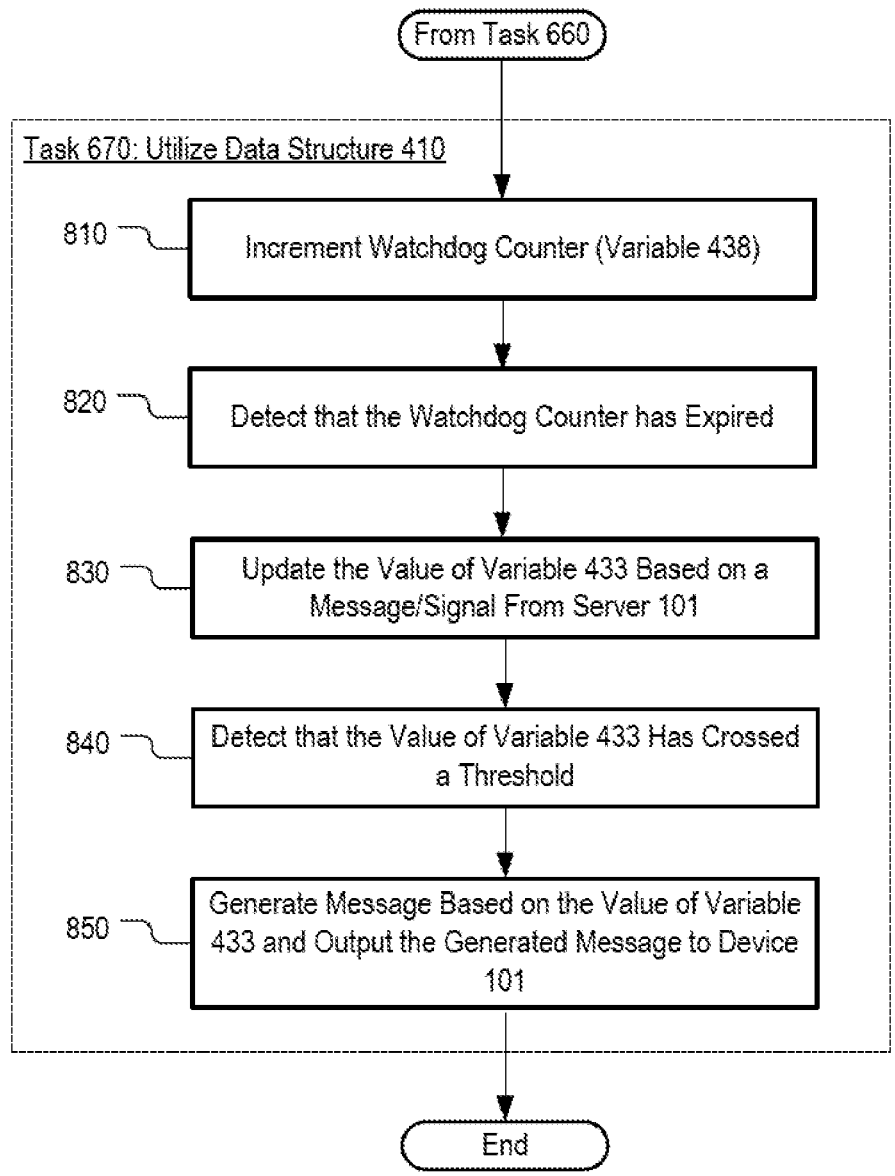
FIG. 8 depicts a flowchart of subtasks associated with FIG. 6.

In one aspect, the search may involve traversing the data structures stored in data structure 151, and for each data structure that is found executing one or more of the subtasks depicted in FIGS. 7-8. In another aspect, task 162 may involve scanning a pre-determined location in memory (e.g., file system directory) where data structures corresponding to controlled devices are likely to be found and for each data structure that is found executing one or more of the subtasks depicted in FIGS. 7-8.

Furthermore, in yet another example, task 630 may involve retrieving from memory 162 a list of ports on interface device 170, and determining for each port whether a data structure (or table row) is stored in memory 162 wherein the data structure includes at least one variable indicates a characteristic of a signal associated with the port, the port being either an input port or output port for that signal. For each data structure that is found, one or more of the subtasks depicted in FIGS. 7-8 may be executed.

Furthermore, in yet another example, task 630 may involve retrieving from memory 162 a list of devices that are controlled with interface device 170, and for each device identifying one or more data structures that are associated with the device (e.g., based on variables 411, 431). Then, for each data structure that is found, one or more of the subtasks depicted in FIGS. 7-8 may be executed. At task 650 data structures 410 and 430 are identified. At task 660, data structure 410 is utilized. Task 660 is further described in the discussion with respect to FIG. 7. At task 670, data structure 410 is utilized. Task 670 is further described in the discussion with respect to FIG. 8. After task 670, the process ends.

FIG. 7 depicts a flowchart of example subtasks associated with using the data structure 410 as shown by task 660 of FIG. 6. In this example, task 660 includes the following subtasks: incrementing the watchdog counter of the data structure (task 710), detecting if the watchdog timer has expired and taking action if it has (task 720), updating the value of variable 413 (task 730), generating a signal based on the value of variable 413 and outputting the generated signal to device 180 (task 740).

At task 710, the watchdog counter variable 416 is incremented. In instances where tasks 650-660 are executed in a control loop, variable 416 is incremented with every loop iteration. At task 720, interface device 170 compares the value of variable 416 to the value of variable 417. If they are equal, the timer (implemented by variable 416 and 417) is considered expired. In one aspect, when the timer has expired, interface device 170 may issue a message to server 101 indicating that the variable 413 is not getting properly updated by the server. The message may be issued by calling the service_control( ) function that is part of functions 143. In another aspect, in response to the timer expiring, interface device 170 may issue a message to server 191 instructing it take over the responsibilities of server 101 and update the value of variable 413.

In yet another aspect, interface device 170 may execute control logic 141. The execution of control logic 141 may result in interface device 170 determining the value of variable 413 by itself without input from server 101. Alternatively, the execution of control logic may result in control logic 141 shutting down server rack 180 by issuing a "switch off" signal from port 245.

It should be noted that control logic 141 may operate in a different manner from control logic 132 of server 101. For instance, control logic 132 and control logic 141 may use different types and amounts of information when generating control signals. For example, server 101 may be in charge of an entire server room. The server 101 may be connected to a plurality of interface devices, each device corresponding to the cooling system of a different server rack. When generating a control signal, the server may base the control signal on information that is unavailable to device 170 and by proxy to control logic 143. For example, the signal may be based on the room temperature inside the server room and not only on the air temperature inside server rack 180. In that regard, the logic 132 of server 101 may be more complex and take into account additional information that is not available to the interface device 170. In other words, control logic 132 and control logic 141 could may differ in the manner in which they operate.

At task 730, interface device 170 receives, over connection 195, a message requiring it to update the value of variable 413. The message, may include an indication of a new value for variable 413. In the present example, the message may include the same or a different voltage value for the signal that is fed to cooling fan 182, but in other examples, the message may specify another electric signal characteristic (e.g., current magnitude, frequency) or it may include a code (e.g., bit code) to be passed to device 180.

In response to receiving the signal, interface device 170 may reset variable 416. For example, variable 416 may be set back to zero. Resetting variable 416 prevents the watchdog counter (implemented by variables 416 and 417) from expiring when the value of variable 413 is updated regularly.

Afterwards, interface device 170 may update the value variable 413 to the value indicated by the received message. In one example, the update may be unconditional—that is, the value of variable 413 may updated every time a message containing an indication of a "fan power" signal value is received. In another example, the value of variable 413 may be updated only when a predetermined condition is met. For instance the value of variable 413 may be set to equal a value indicated in the message received from server 101 only when the difference between its current value and the value indicated in the message exceeds a predetermined threshold.

Furthermore, storing the received indication of a signal value in data structure 410 may involve translating the indication to a specific subtype. The translation may be performed by using one or more of the subtype definitions 144.

At task 740, interface device 170 retrieves from memory the value of variable 413 and adjusts the signal that is output over the port identified by variable 415 (e.g., port 241). The adjustment may involve: starting to feed a signal having a characteristic that is indicated by variable 413, or altering a signal that is already being transmitted, to have a characteristic that is indicated by variable 413. In the present example, the characteristic is voltage, but it can be another characteristic, such as frequency or current flow rate for example.

FIG. 8 depicts a flowchart of subtasks associated with using the data structure 430 as shown by task 670 of FIG. 6. In this example, task 670 includes the following subtasks: incrementing the watchdog counter of the data structure (task 810), detecting if the watchdog timer has expired and taking action if it has (task 820), updating the value of variable 433 based on signal received from device 180 (task 830), detecting that the signal received from device 180 has crossed a threshold (task 840), and transmitting an indication of variable 433 to server 101 (task 850).

At task 810, the watchdog counter variable 439 is incremented. In instances where tasks 650-660 are executed in a control loop, variable 439 is incremented with every loop iteration.

At task 820, interface device 170 compares the value of variable 439 to the value of variable 440. If they are equal, the timer (implemented by variable 439 and 440) is considered expired. In one aspect, following a determination that the timer has expired, interface device 170 may issue a message to server 101 indicating that the value of variable 433 is not updated properly by the device 180. The message may be issued by calling the service_sensor( ) function that is part of functions 143. Such message for example, may indicate a sensor failure in the device 180. In another aspect, when signal from sensor 184a is lost, interface device 170 may use control logic 141 to alone determine the value of a control signal. For example, interface device may generate a control signal for turning the power switch 184 off or running the fan 182 at maximum speed. By powering off device 180 increasing the fan speed to the fullest, interface device 170 may prevent heat damage to server hardware 200 from happening.

At task 830, interface device 170 receives a feedback signal from the device 180 indicating a state of the device 180. The feedback signal may be a sensor reading (e.g. temperature, coolant flow rate), an error code, a status code, or any other type of message that indicates a state of the device 180. In one aspect, the signal may be an analog signal that is fed continuously to the interface device 170 (e.g. signal from sensor 181a) or an analog signal that is transmitted spuriously or periodically by a component of the device 180. Alternatively, the signal may be in the form of one or more messages that are sent over a communications interface (wired or wireless), such as a USB interface, serial interface, Bluetooth, and so forth.

In response to receiving the feedback signal from device 180, interface device 170 may reset variable 439 back to zero. Resetting the watchdog counter prevents the watchdog counter (implemented by variables 439 and 440) from expiring when the value of variable 433 is updated regularly.

Afterwards, interface device 170 may update the value variable 433 based on the received signal. In one aspect, the update may be periodic or executed every time a message from device 180 is received). In another example, the value of variable 433 is updated only when a predetermined condition is met. For instance, the value of variable 433 may be set to equal a value indicated by signal/message received from device 180 only when the difference between its present value and the value indicated in the signal/message exceeds a predetermined threshold. Moreover, updating the value of variable 433 may either involve storing a raw signal value received from sensor 181a or a synthetic value.

At task 840, interface device 170 detects that a signal from device 180 has crossed a threshold by comparing the value of variable 433 to the value of variable 438. When the value of variable 433 is greater than or equal to the value of threshold variable 438, the signal from device 180 may be considered to have crossed a threshold.

In response to detecting that the threshold is crossed, device 180 may transmit an indication of the value of variable 433 to server 101 (e.g., by using the value_changed( ) function). Alternatively, interface device 170 may execute logic 141 to generate a control signal to handle the situation. Such control signal may be one that shuts down the device 180 or speeds up cooling fan 182. In that regard, logic 141 may serve as an emergency backup to server 101 when immediate action is needed.

At task 850, interface device 170 transmits an indication of the value of variable 170 to server 101. In one aspect, device 101 may also transmit an indication of the target value variable 437. In another aspect, task 840 may performed after a predetermined period since the execution of task 850 (and/or task 740) has passed in order to prevent race conditions (e.g., every 100 ms after).

Figure 9:
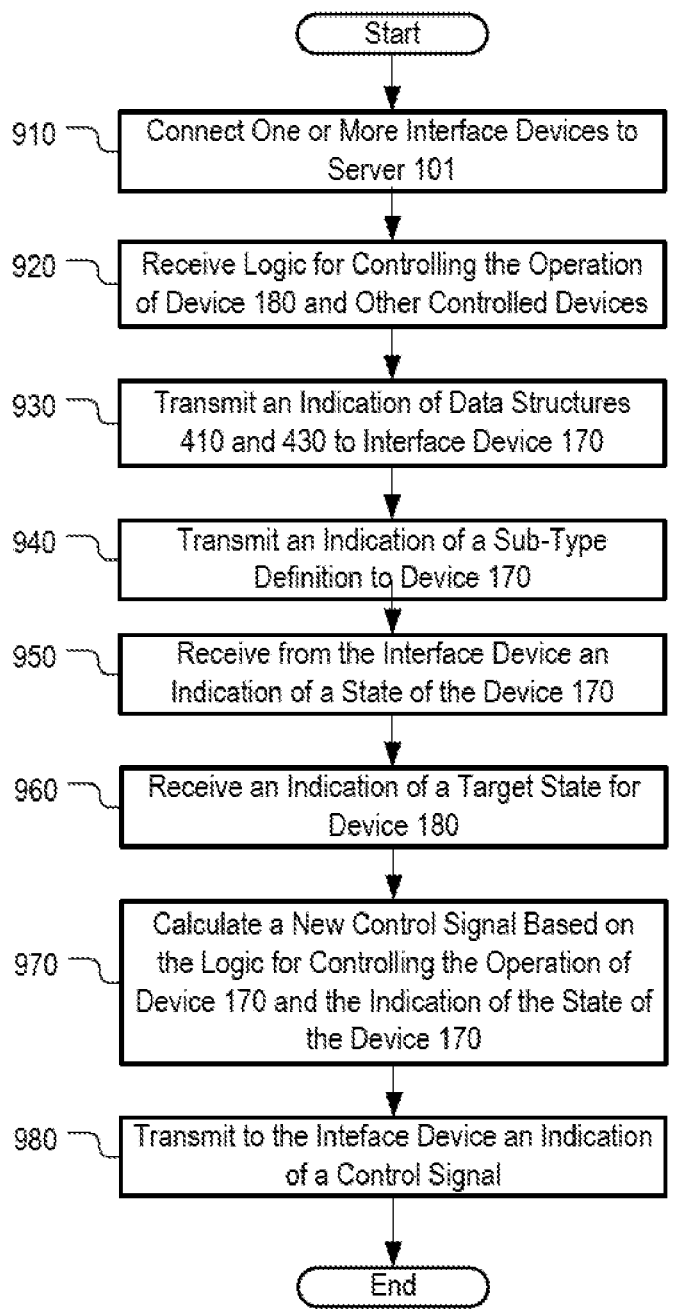
FIG. 9 depicts a flowchart of another process in accordance with aspects of the present disclosure.

FIG. 9 depicts an example flowchart of tasks associated with the operation of server 101.

At task 910 one or more interface devices, such as interface device 170, are connected to server_101. The devices may be connected via a wired or wireless connection. As discussed above, the connection may be a USB connection, TCP connection, or any other type of connection.

At task 920, server_101 receives logic for controlling the operation of one or more controlled device 180. The logic may be received in the form of an executable script, an executable file, API upgrade, or firmware upgrade. The logic may be received via an input device, such as a keyboard, or alternatively it may be received over a network connection from a remote server.

At task 930, server 101 transmits to device 170 data structures 410 and 430. The data structures may be transmitted as a text stream, binary stream, or any other form.

At task 940, server 101 transmits to device 170 a subtype definition. The subtype definition may be transmitted as a text stream, binary stream, or any other form.

At task 950, server 101 receives an indication of a state of the device 180. The indication may be received in the form of a signal that is generated by interface device 170 based on the value of variable 433.

At task 960, server 101 receives an indication of a target state for device 180. The indication may be based on the value of variable 437 which sets a target temperature for device 180.

At task 970, the server 101 calculates a control signal. The control signal may be based on the indication of the state of device 180 received at task 950, or it may based on both the indication of the state and the indication of a target state.

At task 980, server 101 transmits an indication of a control signal to interface device 170. The indication may be transmitted as a text stream, binary stream, or any other form.

FIGS. 6-9 are provided as an example. In some aspects, at least some of the tasks associated with FIGS. 3-9 may be performed in a different order than represented or performed concurrently. Furthermore, in some aspects, some of tasks in FIGS. 6-9 may be altogether omitted. Although data structures 410 and 430 each contain an indication of one characteristic each of them may indicate indications of multiple characteristics of the same signal. More over each of the data structures may be associated with multiple signals, possibly having different directions, even, and include indications of characteristics of all of the signals which it is associated with.

As these and other variations and combinations of the features discussed above can be utilized without departing from the subject matter as defined by the claims, the foregoing description of exemplary aspects should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. An interface apparatus for connecting a server to a device controlled by the server, the apparatus comprising:

a first interface for connecting the interface apparatus to the device;

a second interface for connecting the interface apparatus to the server;

a memory for storing a data structure that includes a first variable having a value, the value indicating a control signal characteristic, the control signal characteristic being determined by the server as part of the server's controlling of the device;

a processor coupled to the memory, the processor being configured to:

search the memory for one or more data structures that correspond to one or more signals transmitted, via the interface apparatus, between the server and the device;

identify the corresponding one or more data structures as a result of the search;

in response to identifying the data structure, generate a control signal for controlling the operation of the device, the control signal having the control signal characteristic indicated by the value of the first variable; and output the control signal to the device via the first interface.

2. The interface apparatus of claim 1, wherein the processor is further configured to update the value of the first variable based on content of one or more messages received from the server via the second interface.

3. The interface apparatus of claim 1, wherein the processor is further configured to:

receive the data structure from the server via the second interface; and store the data structure in the memory.

4. The interface apparatus of claim 1, wherein the search of the memory is performed repeatedly by the processor in accordance with a control loop that controls the operation of the interface apparatus.

5. The interface apparatus of claim 1, wherein the data structure includes a second variable and a third variable, the third variable identifying a routine to be invoked when the value of the first variable matches a value of the second variable.

6. The interface apparatus of claim 1, wherein the value of the first variable indicates a characteristic of an analog signal that is supplied via the first interface to the device controlled by the server.

7. The interface apparatus of claim 1, wherein the data structure includes an indication of a sub-type of the first variable and the memory also stores at least one of data and processor-executable instructions for translating content of a message from a first format to a second format that corresponds to the sub-type, wherein the processor is further configured to:

receive from the server a message indicating a characteristic of the control signal;

translate the message to produce a synthetic value, the translation being based on the indication of the sub-type and at least one of the data and processor-executable instructions; and update the value of the first variable based on the synthetic value.

8. The interface apparatus of claim 1, wherein the control signal controls operation of an actuator that is part of the device controlled by the server.

9. An interface apparatus for connecting a server to a device controlled by the server, the interface apparatus comprising:

a first interface for receiving, from the device, a feedback signal;

a second interface for transmitting, to the server, an indication of a characteristic of the feedback signal;

a memory for storing a data structure that includes a first variable having a first value, the first value indicating the characteristic of the feedback signal;

a processor coupled to the memory, the processor being configured to:

search the memory for one or more data structures that correspond to one or more signals that are transmitted, via the interface apparatus, between the server and the device;

identify the corresponding one or more data structures as a result of the search;

in response to identifying the data structure, generate a message based on the value of the first variable, the generated message indicating the characteristic of the feedback signal; and transmit the generated message to the server via the second interface.

10. The interface apparatus of claim 9, wherein the processor is further configured to update the value of the first variable based on signal received from the device via the first interface.

11. The interface apparatus of claim 9, wherein the processor is further configured to:

receive the data structure from the server via the second interface; and store the data structure in the memory.

12. The interface apparatus of claim 9, wherein the search of the memory is performed repeatedly by the processor in accordance with a control loop that controls the operation of the interface apparatus.

13. The interface apparatus of claim 9, wherein the data structure includes a second variable and a third variable, the third variable identifying a procedure to be invoked when the value of the first variable matches a value of the second variable.

14. The interface apparatus of claim 9, wherein the data structure includes an indication of a sub-type of the first variable and the memory also stores at least one of data and processor-executable instructions for translating the feedback signal received from the device to a format that corresponds to the sub-type, the processor being further configured to:

translate the feedback signal received from the device to produce a synthetic value, the translation being based on the indication of a sub-type and at least one of the data and processor-executable instructions; and update the value of the first variable based on the synthetic value.

15. The interface apparatus of claim 9, wherein the feedback signal is a signal continuously supplied to the interface apparatus by a sensor that is part of the device controlled by the server.

* * * * *